United States Patent
Kim

(10) Patent No.: US 9,725,122 B2
(45) Date of Patent: Aug. 8, 2017

(54) FRONT VEHICLE BODY STRUCTURE

(71) Applicant: Hyundai Motor Company, Seoul (KR)

(72) Inventor: Heeju Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/943,888

(22) Filed: Nov. 17, 2015

(65) Prior Publication Data

US 2017/0043810 A1 Feb. 16, 2017

(30) Foreign Application Priority Data

Aug. 12, 2015 (KR) .................. 10-2015-0113992

(51) Int. Cl.
| | |
|---|---|
| *B62D 25/08* | (2006.01) |
| *B62D 27/02* | (2006.01) |
| *B62D 21/11* | (2006.01) |
| *B62D 21/09* | (2006.01) |
| *B62D 29/00* | (2006.01) |
| *B60R 19/24* | (2006.01) |

(52) U.S. Cl.
CPC ............ *B62D 25/088* (2013.01); *B60R 19/24* (2013.01); *B62D 21/09* (2013.01); *B62D 21/11* (2013.01); *B62D 27/023* (2013.01); *B62D 29/008* (2013.01); *B60R 2019/247* (2013.01)

(58) Field of Classification Search
CPC ........ B62D 21/02; B62D 21/09; B62D 21/11; B62D 25/082; B62D 25/085; B62D 25/088; B62D 27/023; B62D 29/008
USPC ........................... 296/29, 30, 193.09, 203.02
See application file for complete search history.

(56) References Cited

U.S. PATENT DOCUMENTS

| | | | | | |
|---|---|---|---|---|---|
| 4,919,474 | A | * | 4/1990 | Adachi ................ | B62D 25/088 296/198 |
| 5,456,517 | A | * | 10/1995 | Kalian ................ | B60G 15/068 164/47 |
| 8,777,300 | B2 | * | 7/2014 | Kim ..................... | B62D 25/088 296/192 |
| 2015/0130223 | A1 | * | 5/2015 | Amemiya ............ | B62D 25/088 296/193.09 |
| 2015/0314811 | A1 | * | 11/2015 | Shibata ................ | B62D 25/082 296/193.09 |
| 2016/0244103 | A1 | * | 8/2016 | Amemiya .............. | B62D 21/00 |

FOREIGN PATENT DOCUMENTS

| | | |
|---|---|---|
| JP | 10-316023 A | 12/1998 |
| JP | 2009-137374 A | 6/2009 |
| KR | 10-2014-0024660 A | 3/2014 |

* cited by examiner

*Primary Examiner* — Jason S Daniels
(74) *Attorney, Agent, or Firm* — Morgan Lewis & Bockius LLP

(57) ABSTRACT

A front vehicle body structure may include front upper side members extending in a longitudinal direction of a vehicle and disposed at both left and right sides in a width direction of the vehicle, fender apron upper members which are divided into two while extending in the longitudinal direction of the vehicle, disposed at both left and right sides in the width direction of the vehicle, and disposed above the front upper side members in the height direction of the vehicle, first joints mounted on the front upper side members, second joints connecting two fender apron upper members, and a shock absorber mounting reinforcing member connecting the second joint and the second joint.

12 Claims, 17 Drawing Sheets

FRONT VEHICLE BODY STRUCTURE

CROSS-REFERENCE TO RELATED APPLICATION

The present application claims priority to Korean Patent Application No. 10-2015-0113992 filed Aug. 12, 2015, the entire contents of which is incorporated herein for all purposes by this reference.

BACKGROUND OF THE INVENTION

Field of the Invention

The present invention relates to a front vehicle body structure, and more particularly, to a front vehicle body structure that increases shock absorber mounting strength by mounting a shock absorber in a front vehicle body member formed by coupling space frames.

Description of Related Art

In general, a front vehicle body of a vehicle as a frame structure positioned in front in the longitudinal direction of the vehicle to form an engine room includes a front end module forming the front of the engine room and mounted with a cooling module and a head lamp, a front fender apron member forming both left and right sides of the engine room and having a space where a suspension device is mounted and a wheel is installed, which is provided therein, and a dash panel positioned in the rear of the engine room and partitioning a passenger room and the engine room.

Further, front side members that extend in the longitudinal direction of the vehicle are disposed at both left and right sides on the bottom of the engine room to reinforce structural strength of the front vehicle body and subframes are disposed on the bottom of the front side members to be coupled with the front side members in order to mount and support an engine installed in the engine room, a transmission, and the suspension device.

Meanwhile, a so-called high-performance vehicle promotes a light weight of the vehicle body in order to improve the driving performance of the vehicle, and the like and space frames manufactured by using an aluminum material relatively lighter than steel for achieving a light weight of the vehicle body are coupled to each other to configure the vehicle body.

Small overlap collision stability, driving performance, and ride comfort of the high-performance vehicle need to be improved by improving front small collision coping performance of the vehicle and mounting strength of the shock absorber in the aluminum space frame vehicle body.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a front vehicle body structure which can more safely protect passengers when a front small overlap collision accident occurs by increasing front small overlap collision coping performance of a vehicle through appropriate layout of front side members and improve driving stability and ride comfort of the vehicle by increasing the strength of a shock absorber mounted portion.

According to various aspects of the present invention, a front vehicle body structure may include front upper side members extending in a longitudinal direction of a vehicle and disposed at both left and right sides in a width direction of the vehicle, fender apron upper members which are divided into two while extending in the longitudinal direction of the vehicle, disposed at both left and right sides in the width direction of the vehicle, and disposed above the front upper side members in the height direction of the vehicle, first joints mounted on the front upper side members, second joints connecting two fender apron upper members, and a shock absorber mounting reinforcing member connecting each first joint and second joint.

The shock absorber mounting reinforcing member may have a box shape including a center closed cross section and dual closed cross sections disposed at both left and right sides thereof.

The dual closed cross sections may have a structure in which the dual closed cross sections are continued via a sharing partition.

Each second joint may include a joint body having a polygonal plate shape, which includes a shock absorber insertion hole into which a shock absorber is inserted and a shock absorber fastening hole to which the shock absorber is fastened, a first flange vertically bent downward in the height direction of the vehicle from a first edge of the joint body, and a second flange vertically bent upward in the height direction of the vehicle from a second edge of the joint body.

A plurality of upper reinforcing ribs may be formed in the joint body in a lattice pattern, and two coupling grooves into which a front end of the fender apron upper member is inserted and coupled may be formed by the plurality of ribs and the second flange.

A first lower reinforcing rib may be formed on a bottom of the joint body to cover the shock absorber insertion hole and the shock absorber mounting hole, a plurality of radial second lower reinforcing ribs may be formed at a portion between the first lower reinforcing rib and the shock absorber insertion hole, and a plurality of lattice-shaped third lower reinforcing ribs may be formed outside the first lower reinforcing rib.

A coupling groove into which the top of the shock absorber mounting reinforcing member is inserted and coupled may be formed by the first flange.

The fender apron upper member may have a quadrangular box shape.

In the front upper side member, dual closed cross sections disposed vertically may extend in the longitudinal direction, and, parts of an upper wall, a center wall, and a lower wall forming the dual closed cross sections may be truncated, and resultantly, the first joint may be coupled with the front upper side member to cover the truncated portions.

Each first joint may include a first joint body having a quadrangular plate shape, an upper flange bent inward in the width direction of the vehicle from a top edge of the first joint body to be coupled to the top of the front upper side member in the height direction of the vehicle, and a lower flange bent inward in the width direction of the vehicle from a bottom edge of the first joint body to be coupled to the bottom of the front upper side member in the height direction of the vehicle, in which a coupling groove into which the shock absorber mounting reinforcing member is inserted and coupled may be formed substantially at a center portion of the first joint body in the longitudinal direction, and two fastening bosses having two fastening holes to which a first end of a suspension arm is fastened may protrude in front of the coupling groove in the longitudinal direction of the vehicle, two fastening bosses having two fastening holes to which a second end of the suspension arm is fastened may protrude even in a rear of the coupling groove in the longitudinal direction of the vehicle, and two fastening bosses may be connected to each other by a plurality of radial reinforcing ribs to increase structural rigidity.

Each of the members may be manufactured by an aluminum material through an extrusion process, or each of the members may be manufactured by the aluminum material through a die casting process.

Each of two fender apron upper members may include a front fender apron upper member disposed in front in the longitudinal direction of the vehicle and a rear fender apron upper member disposed in rear in the longitudinal direction of the vehicle, and the front fender apron upper member and the rear fender apron upper member may be coupled to the second joint to form a straight line in the longitudinal direction of the vehicle.

Each of two fender apron upper members may include a front fender apron upper member disposed in front in the longitudinal direction of the vehicle and a rear fender apron upper member disposed in rear in the longitudinal direction of the vehicle, and each of the left and right rear fender apron upper members may be connected to a rear upper cross reinforcing member that extends in the width direction of the vehicle.

According to various embodiments of the present invention, in a front vehicle body structure, lower front side members extend substantially in parallel in the longitudinal direction of a vehicle, while upper front side members extend in the longitudinal direction of the vehicle, but are disposed to be widened outward in the width direction of the vehicle, and as a result, the upper front side members appropriately absorb and reduce a small overlap shock when a front small overlap collision accident occurs, thereby more safely protecting passengers.

As fender apron upper members manufactured by an extrusion process and joints manufactured by a die casting process are combined with each other through appropriate molding, the combination rigidity of the fender apron upper members and the joints increases and when a shock absorber is mounted, the mounting rigidity of a shock absorber mounted portion increases, thereby improving driving performance and ride comfort of a vehicle.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
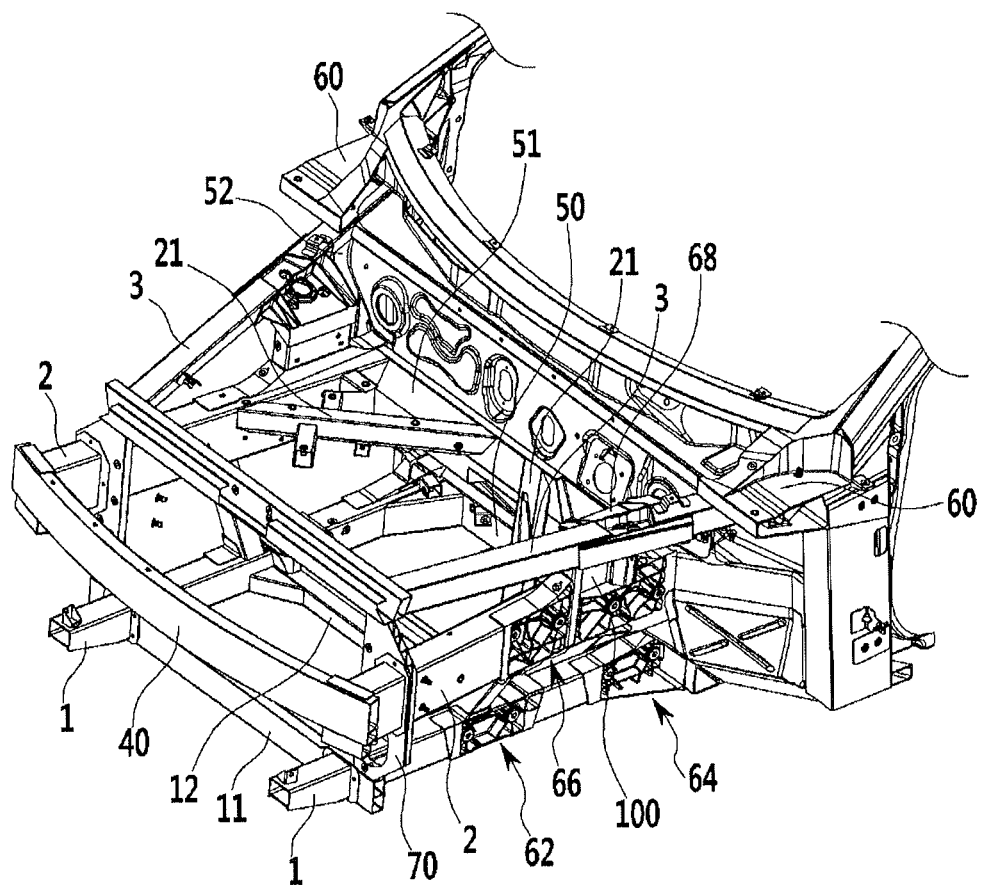
FIG. 1 is a perspective view of an exemplary front vehicle body structure according to the present invention.
Figure 2:
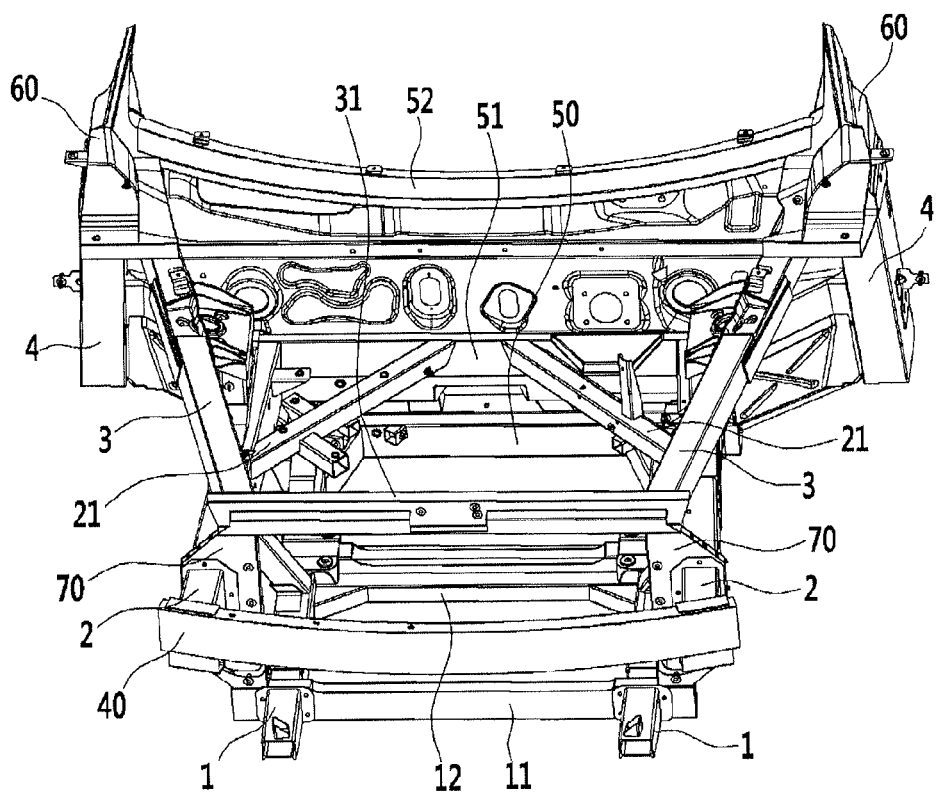
FIG. 2 is a plan view of the exemplary front vehicle body structure according to the present invention.
Figure 3:
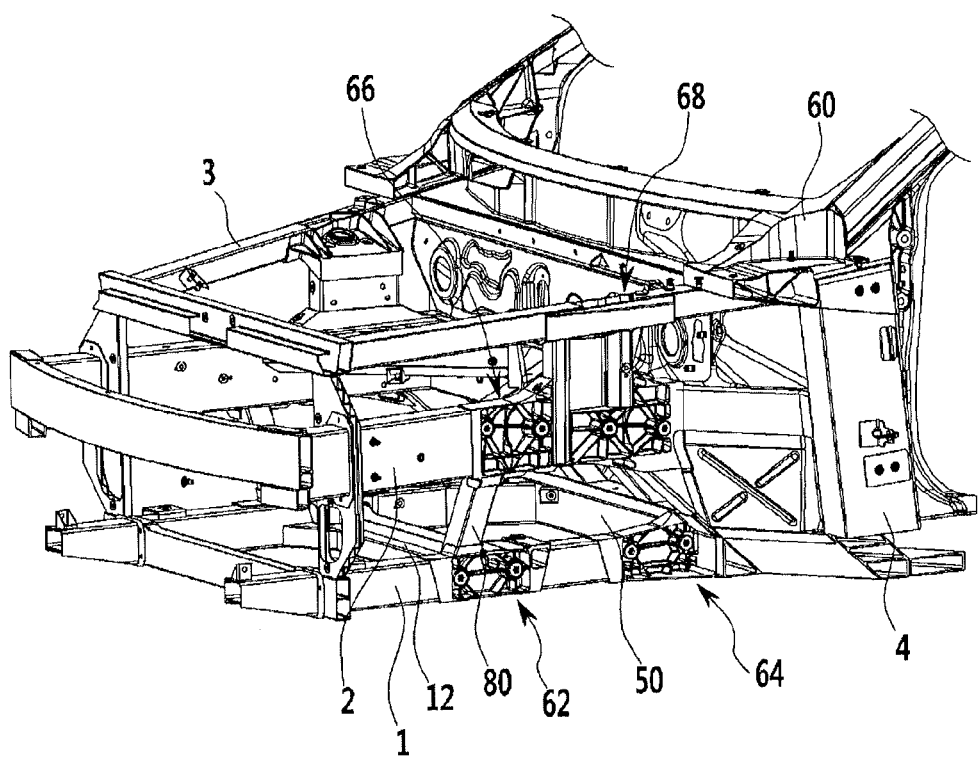
FIG. 3 is an enlarged perspective view of the exemplary front vehicle body structure according to the present invention.

Referring to FIGS. 1 to 3, a front vehicle body structure according to various embodiments of the present invention may include each of front lower side members 1, front upper side members 2, and fender apron upper members 3 which extend in the longitudinal direction of a vehicle.

In the height direction of the vehicle, the front lower side members 1 may be disposed in a lower part, the front upper side members 2 may be disposed at the center, and the fender apron upper members 3 may be disposed in an upper part.

The front lower side members 1 may be disposed at both left and right sides in the width direction of the vehicle and front portions of the front lower side members 1 at both left and right sides in the longitudinal direction of the vehicle may be connected to each other by a front lower cross reinforcing member 11 that extends in the width direction of the vehicle, center portions may be connected to each other by a center lower cross reinforcing member 12 that extends in the width direction of the vehicle, and rear portions may be connected to each other by a dash lower cross reinforcing member 50 that extends in the width direction of the vehicle.

The front upper side members 2 may be disposed at both left and right sides in the width direction of the vehicle, front portions of the front upper side members 2 at both left and right sides in the longitudinal direction of the vehicle may be connected to each other by a bumper beam 40 that extends in the width direction of the vehicle and rear portions may be connected to each other by a dash center cross reinforcing member 51 that extends in the width direction of the vehicle.

The front upper side members 2 at both left and right sides and the dash center cross reinforcing member 51 may be connected to each other by two slope reinforcing members 21 disposed to be inclined the width direction and the longitudinal direction of the vehicle.

Two slope reinforcing members 21 are disposed to be inclined outward in the width direction of the vehicle from the center portion of the dash center cross reinforcing member 51 substantially in the longitudinal direction (the width direction of the vehicle) to be attached to both left and right front upper side members 2, respectively.

Referring to FIG. 2, the front upper side members 2 may be disposed to be further widened outward in the width direction than the front lower side members 1, and as a result, the front upper side members 2 appropriately absorb shock energy to reduce the shock energy when a front small overlap collision accident of the vehicle occurs, thereby improving small overlap collision coping performance.

Two front pillar members 4 that extend in the height direction of the vehicle may be disposed at both left and right sides in the width direction of the vehicle.

The fender apron upper members 3 may be disposed at both left and right sides in the width direction of the vehicle and front portions of the fender apron upper members 3 at both left and right sides in the longitudinal direction of the vehicle may be connected to each other by a front upper cross reinforcing member 31 that extends in the width direction of the vehicle and rear ends may be connected to the both left and right front pillar members 4 through third joints 60.

Both ends of cowl upper cross reinforcing member 52 that extend in the width direction of the vehicle may be coupled to third joints 60 at both left and right sides.

Figure 4:
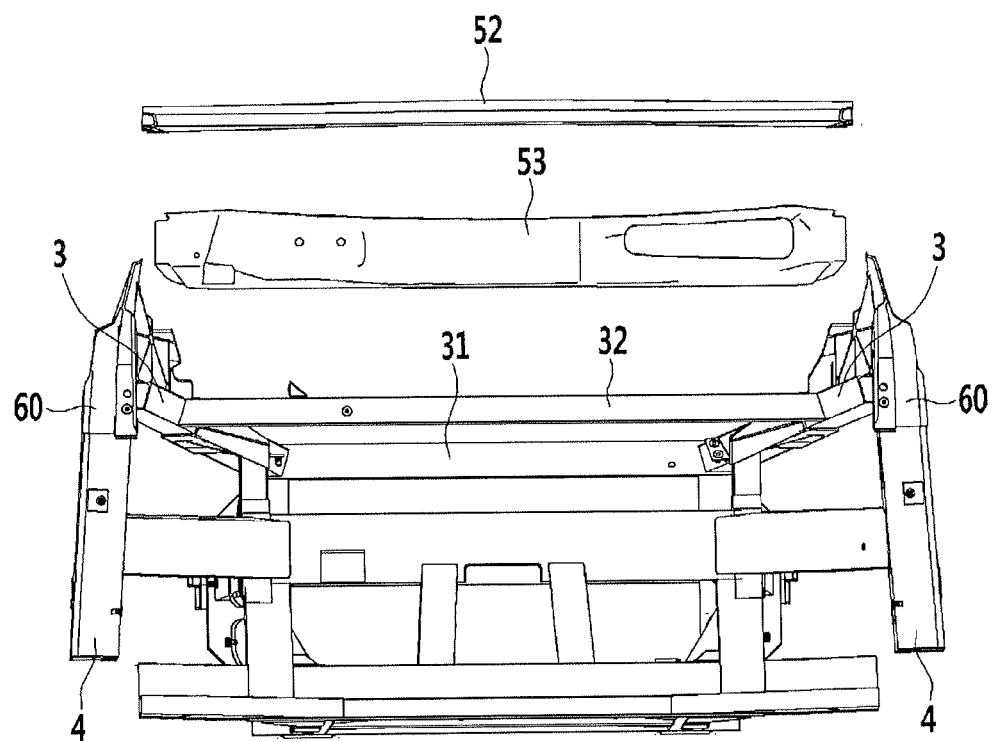
FIG. 4 is a rear exploded perspective view of the exemplary front vehicle body structure according to the present invention.

Referring to FIG. 4, rear portions of the both left and right fender apron upper members 3 in the longitudinal direction of the vehicle may be connected to each other by a rear upper cross reinforcing member 32 that extends in the width direction of the vehicle and a cowl panel 53 that extends in the width direction of the vehicle is interposed between the cowl upper cross reinforcing member 52 and the rear upper cross reinforcing member 32 to be integrally coupled with the cowl upper cross reinforcing member 52 and the rear upper cross reinforcing member 32.

The front lower side members 1, the front upper side members 2, and the fender apron upper members 3 may be connected to each other by reinforcing panels 70 that extend in the height direction of the vehicle.

The front lower side members 1 and the front upper side members 2 may be connected to each other by front side reinforcing members 80 that extend substantially in the height direction of the vehicle from the center portion in the longitudinal direction of the vehicle.

Fourth joints 62 may be coupled to connection portions where the front lower side members 1 are connected with the center lower cross reinforcing member 12, fifth joints 64 may be coupled to connection portions where the front lower side members 1 are connected with the dash lower cross reinforcing member 50, first joints 66 may be coupled to the front upper side members 2, and second joints 68 may be coupled to the fender apron upper members 3.

The third joints 60 to the second joints 68 may be manufactured by, for example, an aluminum material through a die casting process and each of the members may be manufactured by the aluminum material through an extrusion process.

Figure 5:
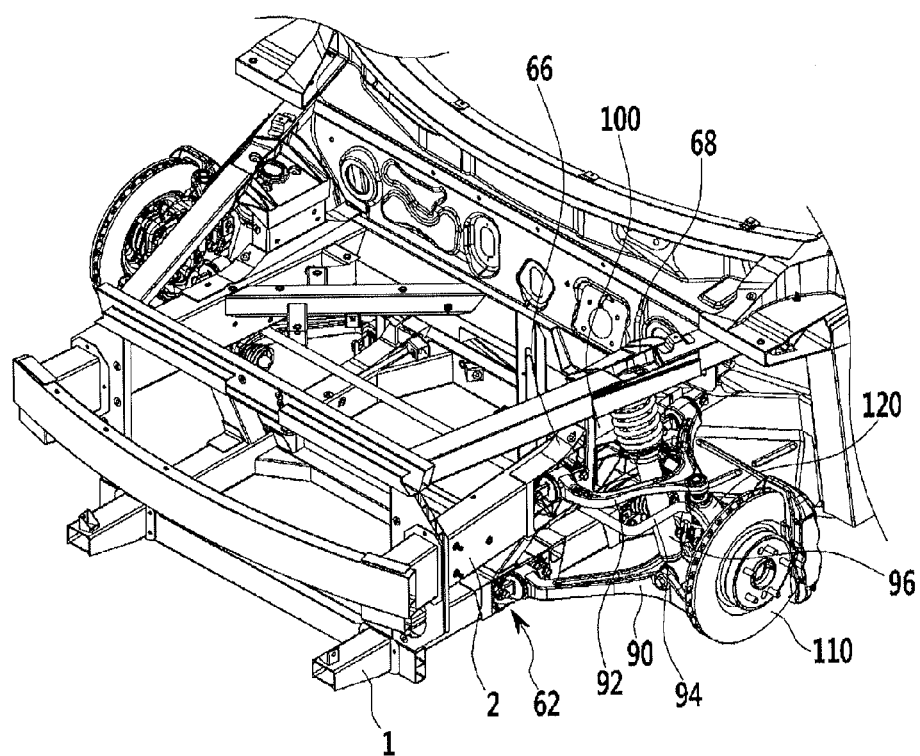
FIG. 5 is a perspective view of the state in which a suspension device is mounted on the exemplary front vehicle body structure according to the present invention.

Referring to FIG. 5, both ends of a lower arm 90 configuring a suspension arm may be fastened and supported onto the fourth joint 62 and the fifth joint 64, respectively, both ends of an upper arm 92 configuring the suspension arm may be fastened and supported onto the first joints 66, respectively, and stabilizer bars 94 that extend in the width direction of the vehicle to control a moment behavior of a vehicle body may be fastened and supported onto the first joints 66.

The first joints 66 and the second joints 68 may be connected to each other by a shock absorber mounting reinforcing member 100 and the tops of shock absorbers 96 configuring a suspension device may be fastened and supported onto the second joints 68.

Reference numeral 110 represents a brake disk for braking a wheel and reference numeral 120 represents a knuckle 120 for steering the wheel and a lower arm 90 and an upper arm 92 may be fastened and supported onto the knuckle 120.

Figure 6:
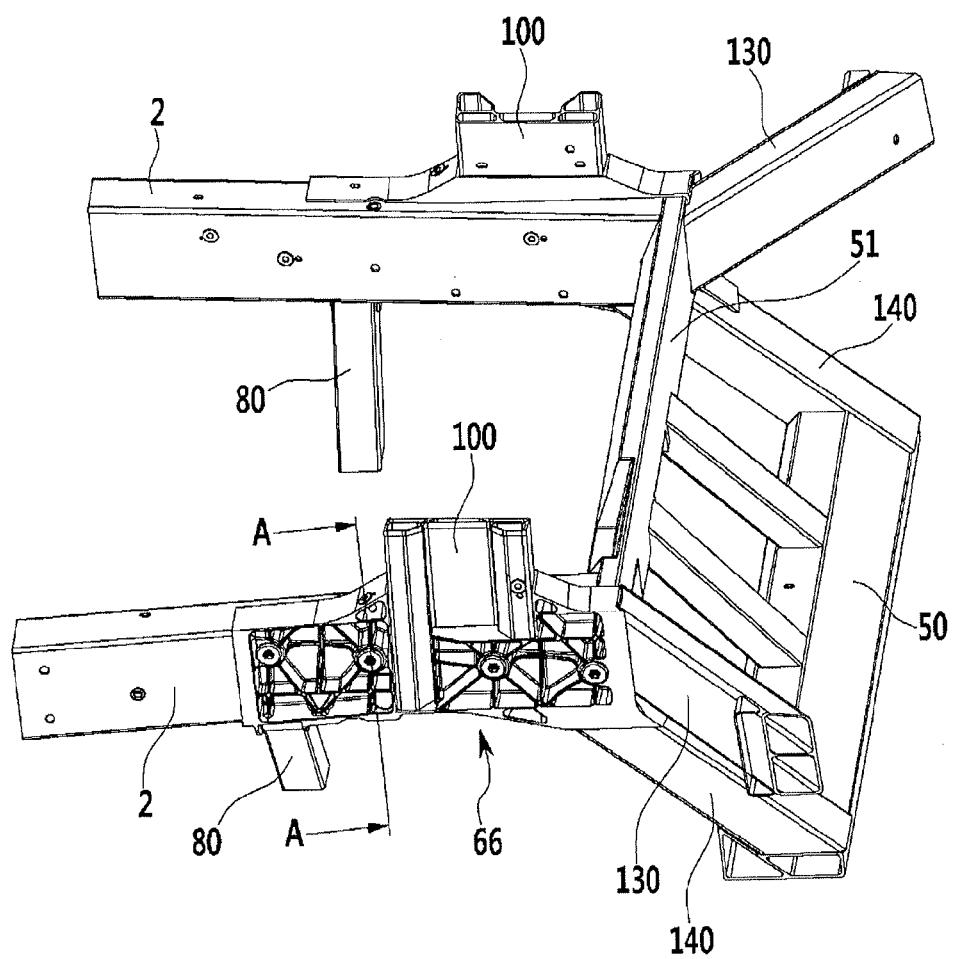
FIG. 6 is a combinational perspective view of front upper side members and dash cross reinforcing members of the exemplary front vehicle body structure according to the present invention.

Referring to FIG. 6, the dash center cross reinforcing member 51 may be connected with the front pillar member 4 through a rear side reinforcing member 130 and the front upper side member 2 may be connected with the dash lower cross reinforcing member 50 through a rear side lower reinforcing member 140.

The first joint 66 may be mounted on the front upper side member 2, a front part in the longitudinal direction of the vehicle may be coupled with the front side reinforcing member 80 and a rear part may be coupled with the rear side reinforcing member 130 and the rear side lower reinforcing member 140, and the shock absorber mounting reinforcing member 100 may be coupled while being inserted therein.

Figure 7:
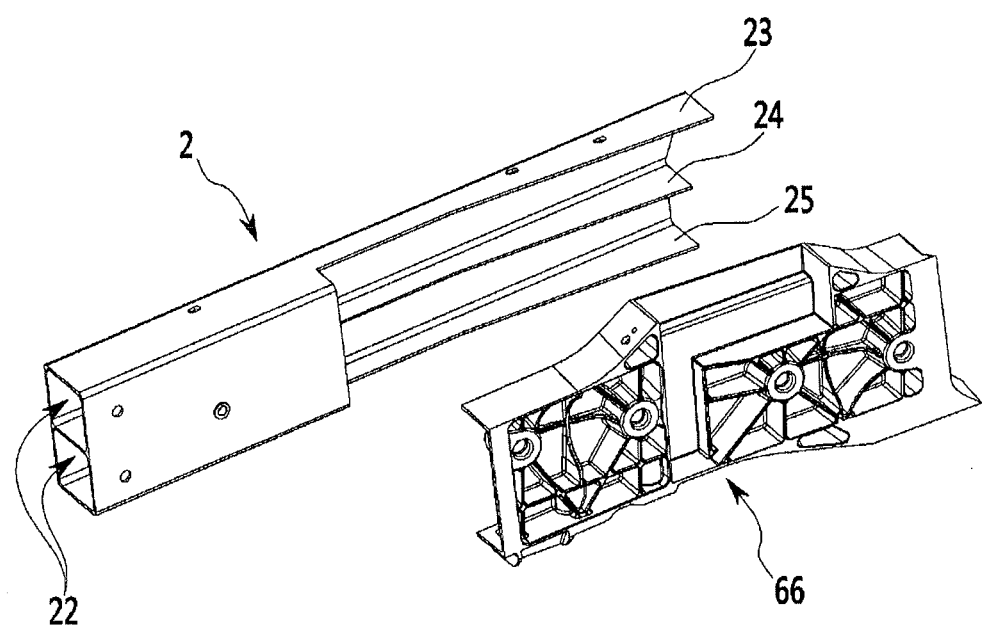
FIG. 7 is an exploded perspective view of the front upper side members and first joints of the exemplary front vehicle body structure according to the present invention.
Figure 8:
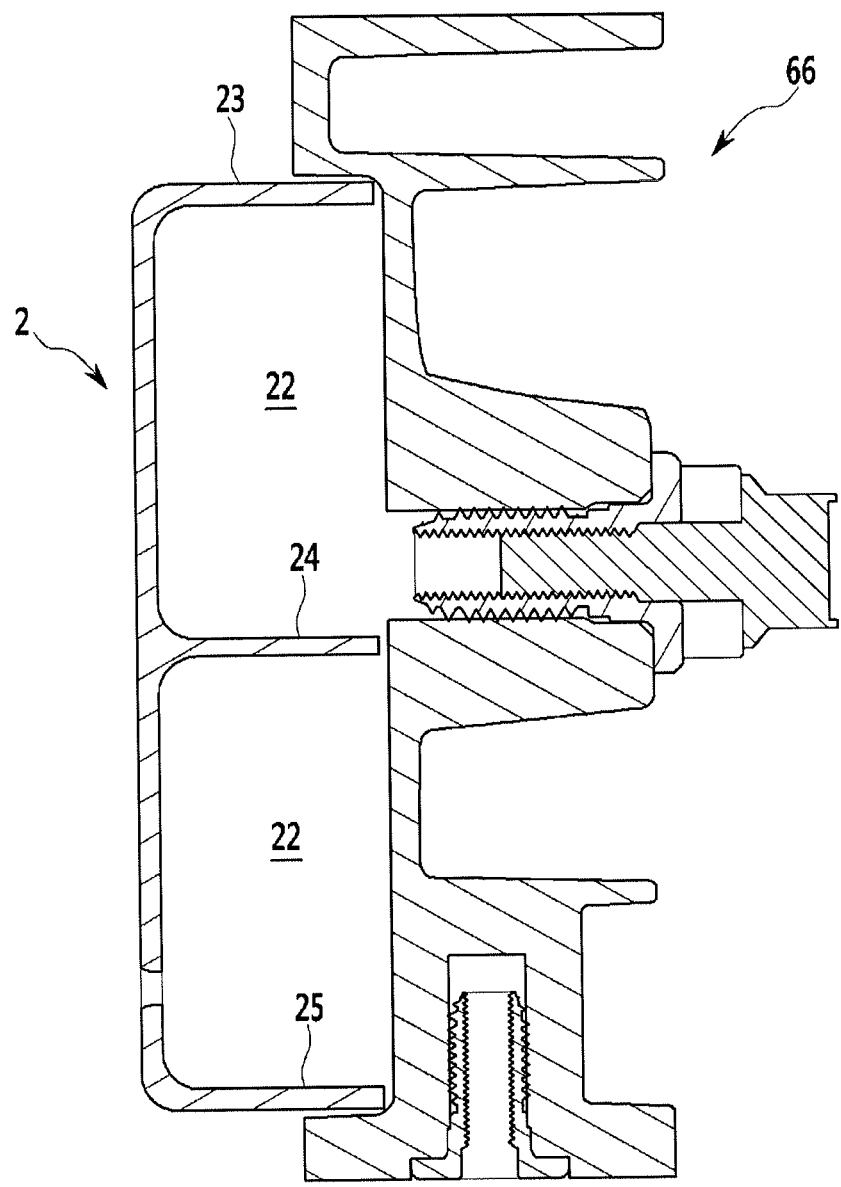
FIG. 8 is a cross-sectional view taken along line A-A of FIG. 6.

Referring to FIGS. 7 and 8, in the front upper side member 2, dual closed cross sections 22 disposed vertically may extend in the longitudinal direction thereof and parts of an upper wall 23, a center wall 24, and a lower wall 25 forming the dual closed cross sections 22 are truncated, and as a result, the first joint 66 may be coupled with the front upper side member 2 to cover the truncated parts.

Figure 9:
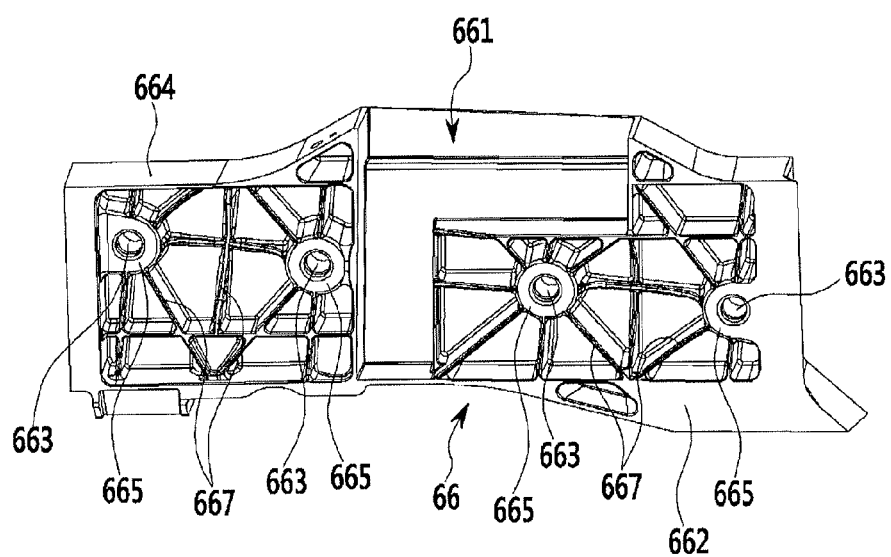
FIG. 9 is a perspective view of the first joint of the exemplary front vehicle body structure according to the present invention.
Figure 10:
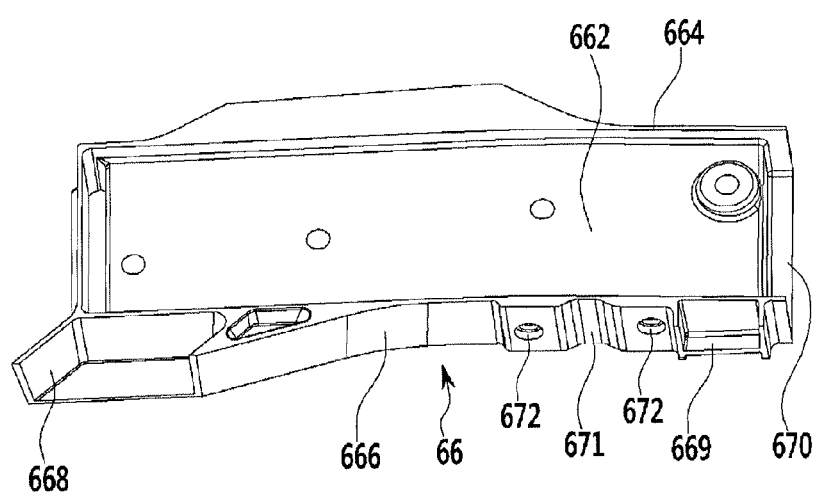
FIG. 10 is a rear perspective view of the first joint of the exemplary front vehicle body structure according to the present invention.

Referring to FIGS. 9 and 10, the first joint 66 may include a first joint body 662 having substantially a quadrangular plate shape, an upper flange 664 bent inward in the width direction of the vehicle from a top edge of the first joint body 662 and coupled onto the top of the front upper side member 2 in the height direction of the vehicle, and a lower flange 666 bent inward in the width direction of the vehicle from a bottom edge of the first joint body 662 and coupled onto the bottom of the front upper side member 2 in the height direction of the vehicle.

A coupling groove 661 into which the shock absorber mounting reinforcing member 100 is inserted and coupled may be formed substantially at a center portion in the longitudinal direction of the first joint body 662, two fastening bosses 665 having two fastening holes 663 to which one end of the upper arm 92 is fastened may protrude in front of the coupling groove 661 in the longitudinal direction of the vehicle, two fastening bosses 665 having two fastening holes 663 to which the other end of the upper arm 92 is fastened may protrude even in the rear of the coupling groove 661 in the longitudinal direction of the vehicle, and two fastening bosses 663 are connected to each other by multiple radial reinforcing ribs 667 to increase structural rigidity.

A first coupling flange 668 into which the other end of the front side reinforcing member 80 is inserted and coupled and a second coupling flange 669 into which the rear side lower reinforcing member 140 is inserted and coupled may be provided in the lower flange 666 and a third coupling flange 670 into which the rear side reinforcing member 130 is inserted and coupled may be provided at a rear end in the longitudinal direction of the first joint body 662.

A support groove 671 into which the stabilizer bar 94 is inserted and supported and fastening holes 672 for fastening the stabilizer bar 94 to the lower flange 666 with a mounting bracket (not illustrated) may be formed in the lower flange 666.

Each of the first coupling flange 668, the second coupling flange 669, and a third coupling flange 67 may be formed to have substantially a "C"-shape cross section.

Figure 11:
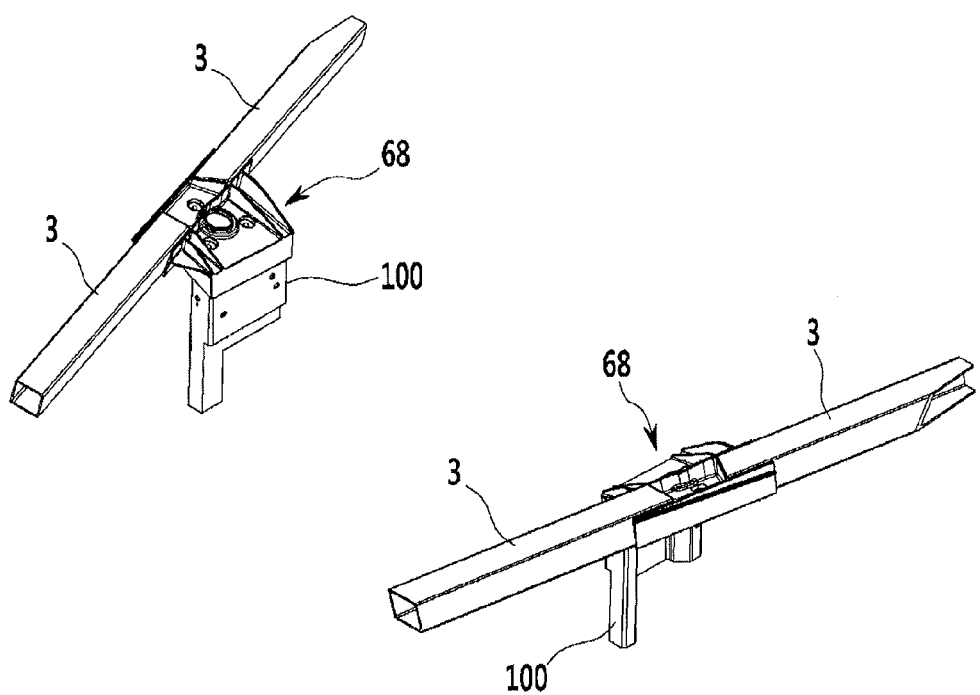
FIG. 11 is a combinational perspective view of fender apron upper members, second joints, and shock absorber mounting reinforcing members of the exemplary front vehicle body structure according to the present invention.
Figure 12:
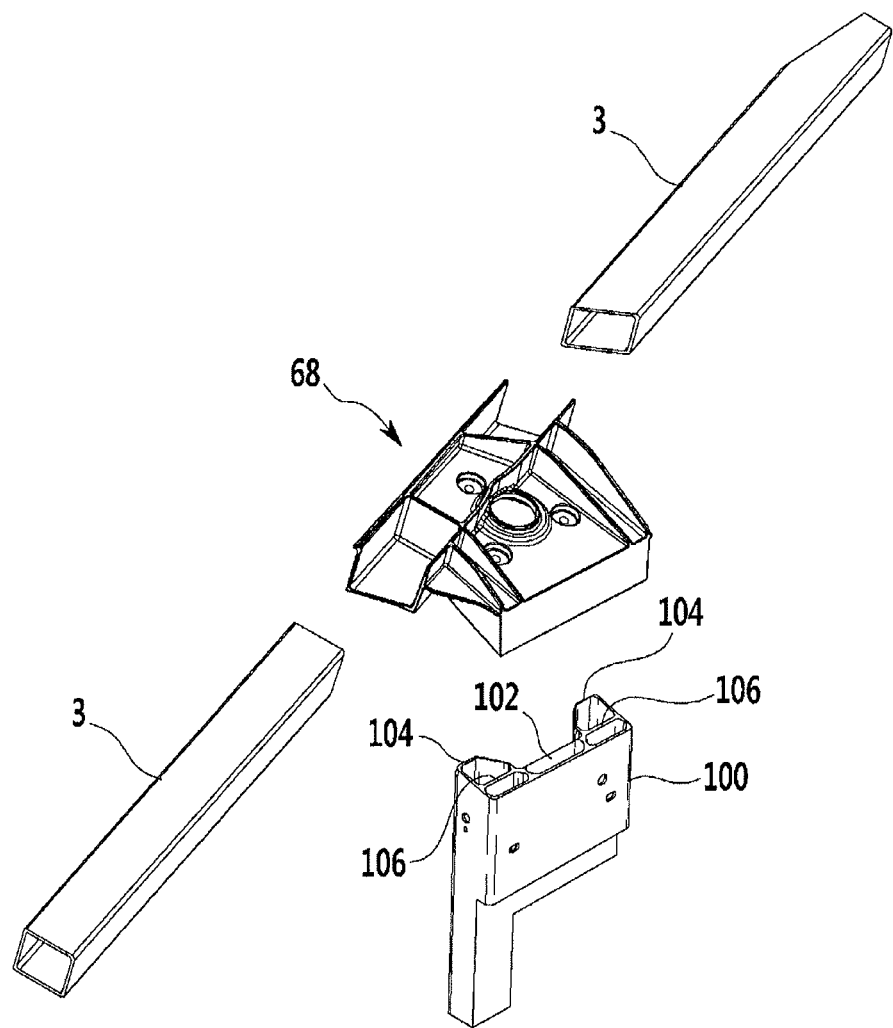
FIG. 12 is an exploded perspective view of the fender apron upper members, the second joints, and the shock absorber mounting reinforcing members of the exemplary front vehicle body structure according to the present invention.

Referring to FIGS. 11 and 12, the fender apron upper member 3 is divided into two to include a front fender apron upper member disposed in front in the longitudinal direction of the vehicle and a rear fender apron upper member disposed in the rear, and the front fender apron upper member and the rear fender apron upper member may be coupled to the second joint 68 to form a straight line in the longitudinal direction of the vehicle.

Further, the front fender apron upper member and the rear fender apron upper member at both left and right sides may be connected to each other by a rear upper cross reinforcing member 32.

The fender apron upper member 3 may have a quadrangular box shape.

The top of the shock absorber mounting reinforcing member 100 in the height direction of the vehicle may be inserted and coupled into the second joint 68.

The shock absorber mounting reinforcing member 100 may have a box shape including a center closed cross section 102 and dual closed cross sections 104 disposed at both left and right sides.

The dual closed cross sections 104 may have a structure in which two closed cross sections are continued via a sharing partition 106.

Figure 13:
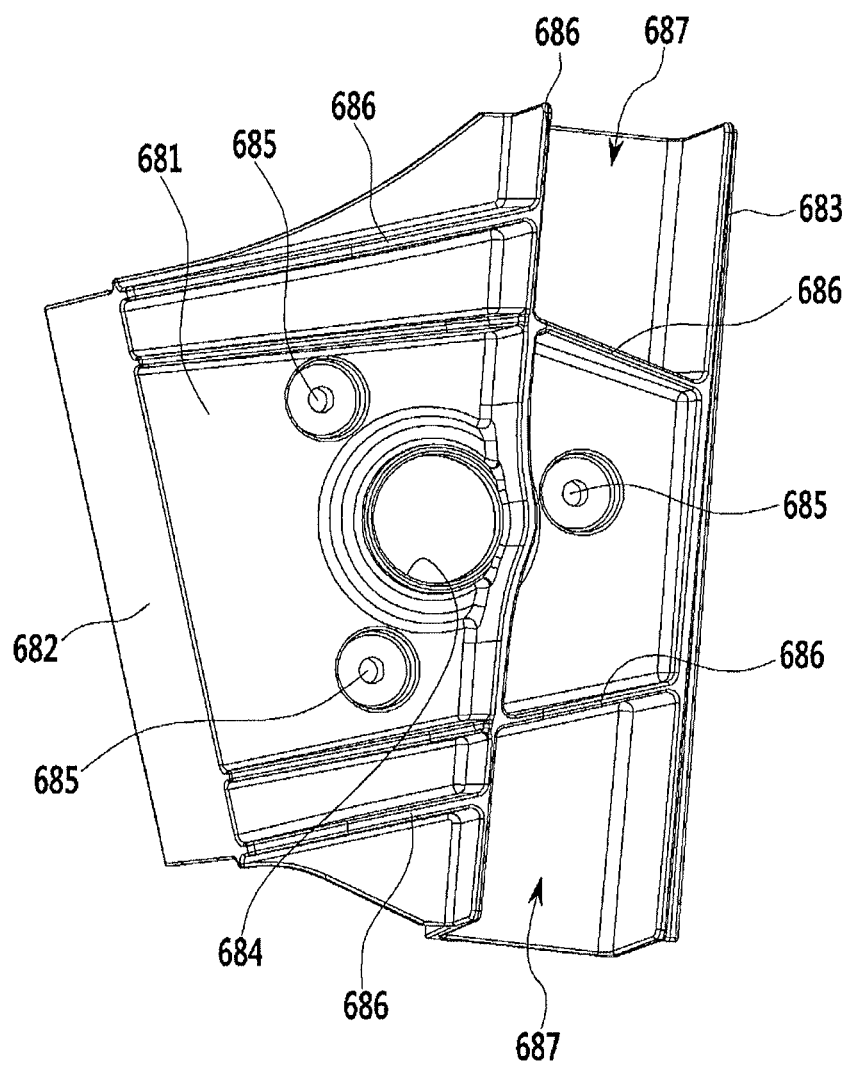
FIG. 13 is a perspective view of the first joint of the exemplary front vehicle body structure according to the present invention.
Figure 14:
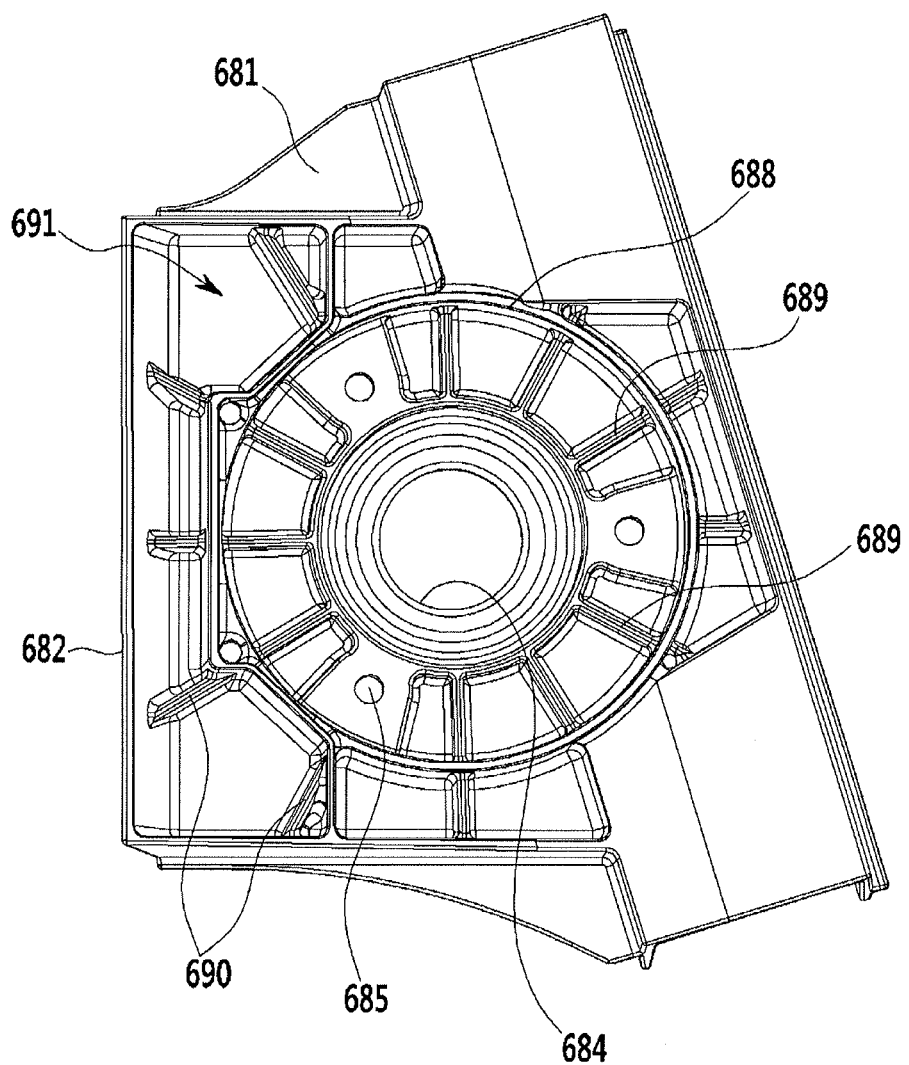
FIG. 14 is a bottom perspective view of the second joint of the exemplary front vehicle body structure according to the present invention.

Referring to FIGS. 13 and 14, the second joint 68 may include each of a joint body 681 having substantially a polygonal plate shape, a first flange 682 vertically bent downward in the height direction of the vehicle from one edge of the joint body 681, and a second flange 683 vertically bent upward in the height direction of the vehicle from the other edge of the joint body 681.

A shock absorber insertion hole 684 into which the shock absorber 96 is inserted may be formed in the joint body 681 substantially in a circular shape and multiple fastening holes 685 to which the shock absorber 96 is fastened may be formed on the periphery of the shock absorber insertion hole 684 at a predetermined interval in a circumferential direction.

Multiple upper reinforcing ribs 686 may be formed in a lattice pattern in order to increase the structural rigidity of the joint body 681.

Two coupling grooves 687 into which front ends of the fender apron upper members 3 are inserted and coupled by the ribs 686 and the second flange 683 are provided in the joint body 681.

Two coupling grooves 687 may have a cross section having substantially a "C" shape.

Lower reinforcing ribs may be formed even on the bottom of the joint body 681 in order to increase the structural rigidity. In particular, the circular first lower reinforcing rib 688 may be formed to cover the shock absorber insertion hole 684 and the shock absorber mounting hole 685 in order to increase peripheral rigidity of the shock absorber insertion hole 684 and the shock absorber mounting hole 685, multiple radial second lower reinforcing ribs 689 may be formed at portions between the first lower reinforcing rib 688 and the shock absorber insertion hole 684, and multiple lattice type third lower reinforcing ribs 690 may be formed even at a circular exterior of the first lower reinforcing rib 688.

The first, second, and third lower reinforcing ribs and the upper reinforcing ribs increase the structural rigidity of the second joint 68 and the resulting shock absorber mounting rigidity to improve driving stability and ride comfort of the vehicle.

Further, a coupling groove to which the top of the shock absorber mounting reinforcing member 100 is inserted and coupled may be formed by the first flange 682.

Figure 15:
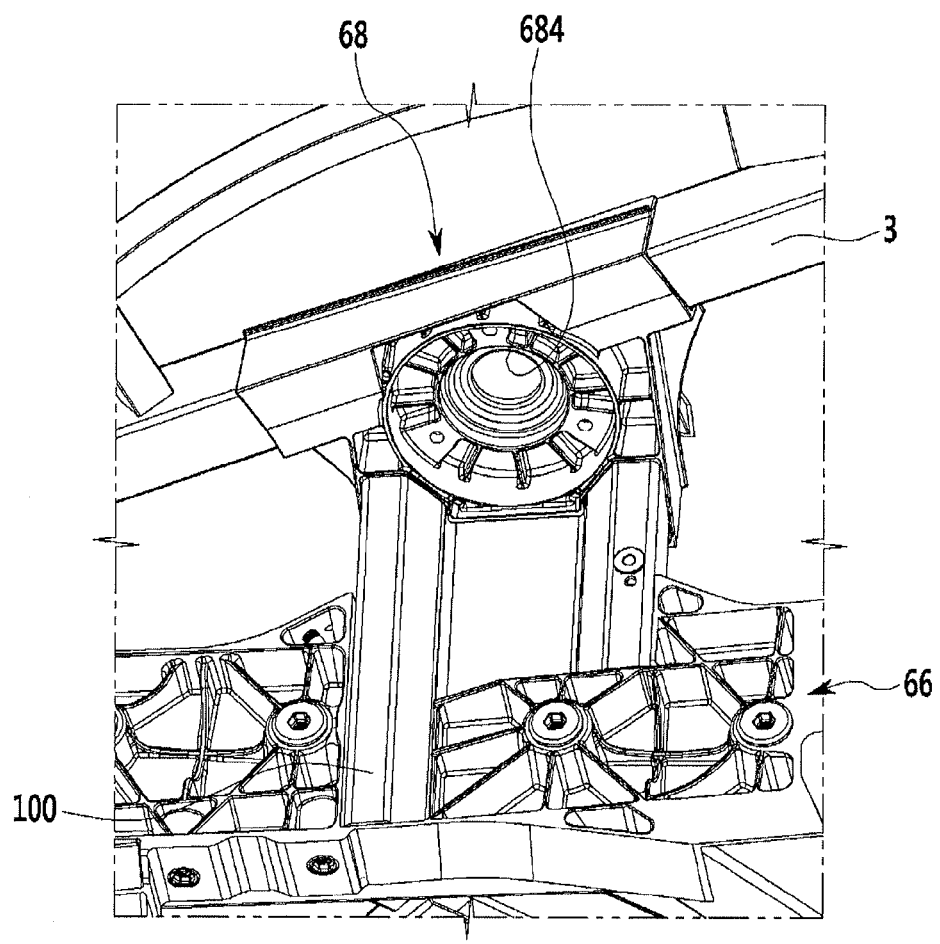
FIG. 15 is a bottom perspective view of the fender apron upper members, the second joints, and the shock absorber mounting reinforcing members of the exemplary front vehicle body structure according to the present invention.
Figure 16:
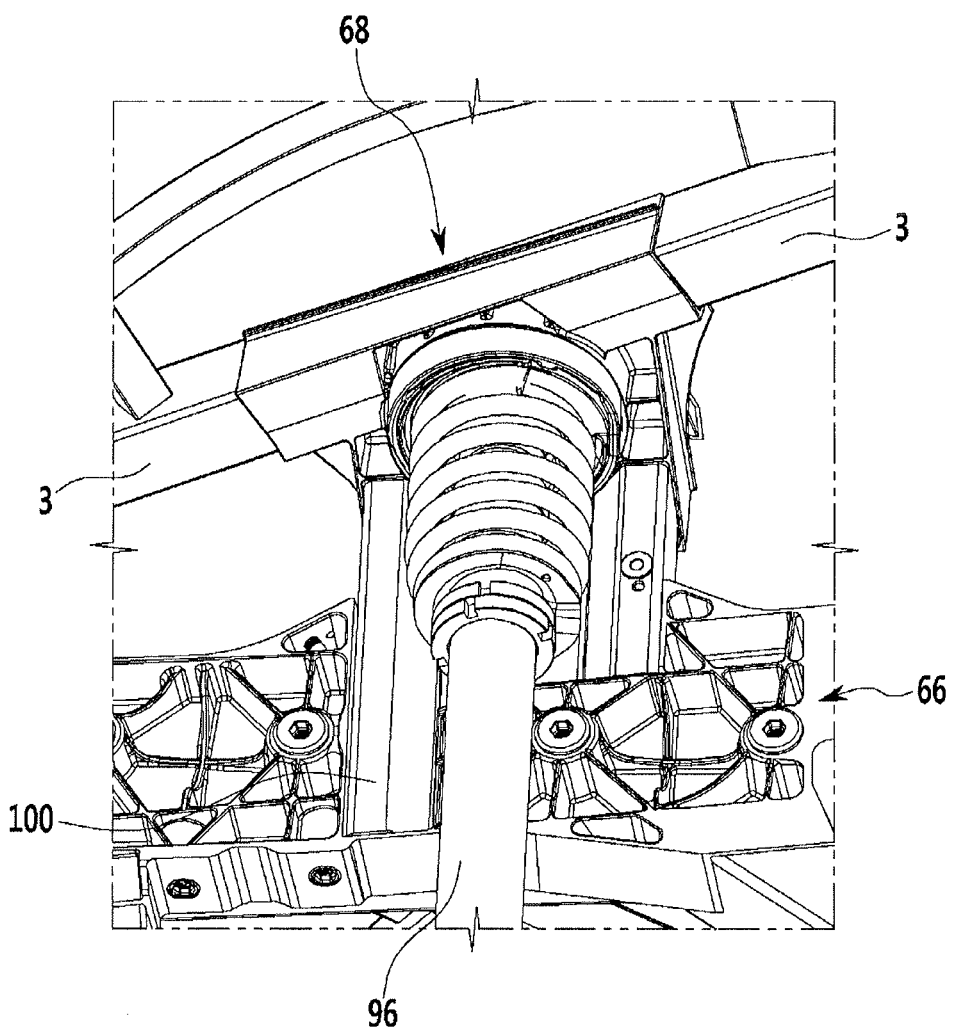
FIG. 16 is a perspective view of the state in which a shock absorber is mounted in FIG. 15.

Referring to FIGS. 15 and 16, in the shock absorber mounting reinforcing member 100, a lower end is inserted and coupled into the first joint 66 and an upper end is inserted and coupled into the second joint 68, the first joint 66 is mounted on the front upper side member 2 and the second joint 68 is mounted on the fender apron upper member 3, and while the fender apron upper member 3, the front upper side member 2, each joint, and the shock absorber mounting reinforcing members 100 are structurally rigidly coupled, as the shock absorber 96 is mounted on the second joint 68, the mounting rigidity of the shock absorber 96 increases to stably support the shock absorber 96.

Figure 17:
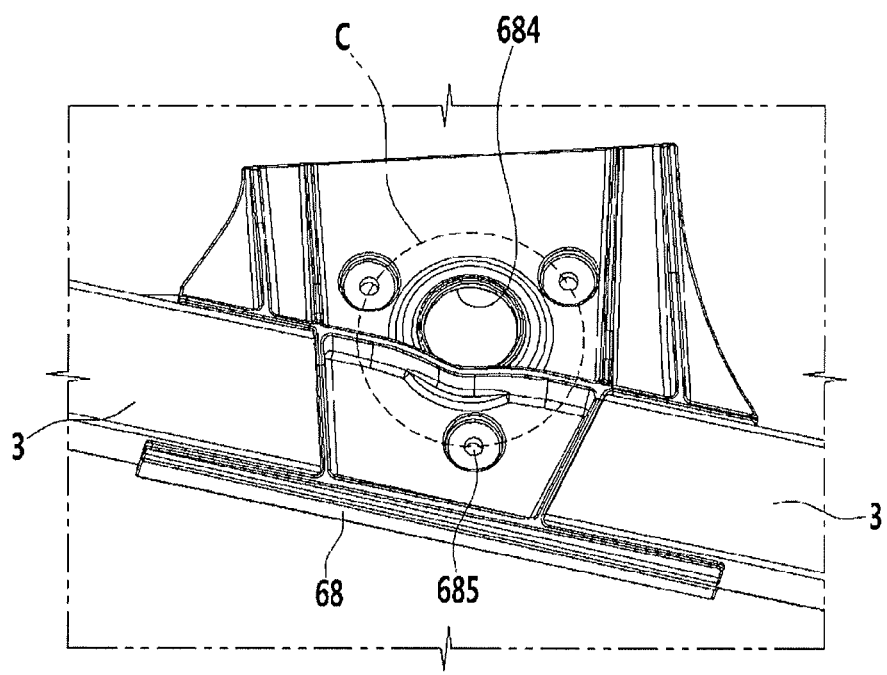
FIG. 17 is a plan view of the state in which the fender apron upper members and the second joints of the exemplary front vehicle body structure are combined with each other according to the present invention.

Referring to FIG. 17, an interval between a portion in which an external load is input and the fender apron upper member 3 is narrower than the interval in the related art through a shock absorber load input unit C connecting the shock absorber fastening holes 685 and the shock absorber 96 to increase twisting rigidity of the vehicle body and increase the rigidity of the load input unit.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front vehicle body structure comprising:
   front upper side members extending in a longitudinal direction of a vehicle and disposed at both left and right sides in a width direction of the vehicle;
   fender apron upper members which are divided into two while extending in the longitudinal direction of the vehicle, disposed at both left and right sides in the width direction of the vehicle, and disposed above the front upper side members in a height direction of the vehicle;
   first joints mounted on the front upper side members;
   second joints connecting the two fender apron upper members; and
   a shock absorber mounting reinforcing member connecting each first joint and second joint,
   wherein:
      in the front upper side members, dual closed cross sections disposed vertically extend in the longitudinal direction, and,
      parts of an upper wall, a center wall, and a lower wall forming the dual closed cross sections are truncated, and resultantly, the first joints are coupled with the front upper side members to cover the truncated portions.

2. The front vehicle body structure of claim 1, wherein the shock absorber mounting reinforcing member has a box shape including a center closed cross section and dual closed cross sections disposed at both left and right sides thereof.

3. The front vehicle body structure of claim 2, wherein the dual closed cross sections have a structure in which the dual closed cross sections are continued via a sharing partition.

4. The front vehicle body structure of claim 1, wherein each second joint comprises:
   a joint body having a polygonal plate shape, which includes a shock absorber insertion hole into which a shock absorber is inserted and a shock absorber fastening hole to which the shock absorber is fastened;
   a first flange vertically bent downward in the height direction of the vehicle from a first edge of the joint body; and
   a second flange vertically bent upward in the height direction of the vehicle from a second edge of the joint body.

5. The front vehicle body structure of claim 4, wherein:
   a plurality of upper reinforcing ribs are formed in the joint body in a lattice pattern, and
   two coupling grooves into which a front end of the fender apron upper member is inserted and coupled are formed by the plurality of ribs and the second flange.

6. The front vehicle body structure of claim 5, wherein:
   a first lower reinforcing rib is formed on a bottom of the joint body to cover the shock absorber insertion hole and the shock absorber mounting hole,
   a plurality of radial second lower reinforcing ribs are formed at a portion between the first lower reinforcing rib and the shock absorber insertion hole, and
   a plurality of lattice-shaped third lower reinforcing ribs is formed outside the first lower reinforcing rib.

7. The front vehicle body structure of claim 4, wherein a coupling groove into which the top of the shock absorber mounting reinforcing member is inserted and coupled is formed by the first flange.

8. The front vehicle body structure of claim 1, wherein the fender apron upper member has a quadrangular box shape.

9. The front vehicle body structure of claim 1, wherein each first joint comprises:
   a first joint body having a quadrangular plate shape, an upper flange bent inward in the width direction of the vehicle from a top edge of the first joint body to be coupled to the top of the front upper side member in the height direction of the vehicle, and a lower flange bent inward in the width direction of the vehicle from a bottom edge of the first joint body to be coupled to the bottom of the front upper side member in the height direction of the vehicle,
   wherein a coupling groove into which the shock absorber mounting reinforcing member is inserted and coupled is formed substantially at a center portion of the first joint body in the longitudinal direction, and
   wherein two fastening bosses having two fastening holes to which a first end of a suspension arm is fastened protrude in front of the coupling groove in the longitudinal direction of the vehicle, two fastening bosses having two fastening holes to which a second end of the suspension arm is fastened protrude even in a rear of the coupling groove in the longitudinal direction of the vehicle, and two fastening bosses are connected to each other by a plurality of radial reinforcing ribs to increase structural rigidity.

10. The front vehicle body structure of claim 1, wherein:
    each of the front upper side members and the fender apron upper members is manufactured by an aluminum material through an extrusion process, and
    each of the first joints and the second joints is manufactured by the aluminum material through a die casting process.

11. The front vehicle body structure of claim 1, wherein:
    each of two fender apron upper members includes a front fender apron upper member disposed in front in the longitudinal direction of the vehicle and a rear fender apron upper member disposed in rear in the longitudinal direction of the vehicle, and
    the front fender apron upper member and the rear fender apron upper member are coupled to the second joint to form a straight line in the longitudinal direction of the vehicle.

12. The front vehicle body structure of claim 1, wherein:
    each of two fender apron upper members includes a front fender apron upper member disposed in front in the longitudinal direction of the vehicle and a rear fender apron upper member disposed in rear in the longitudinal direction of the vehicle, and
each of the left and right rear fender apron upper members is connected to a rear upper cross reinforcing member that extends in the width direction of the vehicle.

* * * * *